(12) United States Patent
Kingsley

(10) Patent No.: US 6,560,228 B2
(45) Date of Patent: *May 6, 2003

(54) GENERATION OF INFORMATIVE MAC HEADERS FOR ANALYSIS OF ATM ROUTED LAN FRAMES

(75) Inventor: Paul M. Kingsley, Colorado Springs, CO (US)

(73) Assignee: Agilent Technologies, Inc., Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/108,524

(22) Filed: Jul. 1, 1998

(65) Prior Publication Data

US 2002/0057690 A1 May 16, 2002

(51) Int. Cl.$^7$ ................................................ H04L 12/28
(52) U.S. Cl. ........................................ 370/392; 370/393
(58) Field of Search ................................ 370/348, 389, 370/392, 397, 399, 409, 471, 474, 395.1, 396, 395.53, 395.6, 395.63

(56) References Cited

U.S. PATENT DOCUMENTS

| | | | | |
|---|---|---|---|---|
| 5,946,313 A | * | 8/1999 | Allan et al. ................ | 370/397 |
| 5,999,541 A | * | 12/1999 | Hinchey et al. ............. | 370/466 |
| 6,064,674 A | * | 5/2000 | Doidge et al. .............. | 370/398 |
| 6,081,524 A | * | 6/2000 | Chase et al. ................ | 370/389 |
| 6,118,783 A | * | 9/2000 | Kunito ........................ | 370/399 |
| 6,151,324 A | * | 11/2000 | Belser et al. ................ | 370/397 |
| 6,185,215 B1 | * | 2/2001 | Aho ............................ | 370/402 |
| 6,275,494 B1 | * | 8/2001 | Endo et al. .................. | 370/395 |

OTHER PUBLICATIONS

Excerpt (pp. 22 and 30) "The Lan Protocol" by Mark Miller, 1990, IDG Books World Wide.

Excerpt (pp. 5–7) RFC 1483, by Juha Heinanen 1993.

* cited by examiner

Primary Examiner—Wellington Chin
Assistant Examiner—Brenda Pham

(57) ABSTRACT

The inventive interface mechanism generates an imitation MAC header and places the header before the data portion of the frame. The imitation header is formed from useful information which will enhance the troubleshooting process of analyzer software. The information would allow for upper layer protocol problems to be mapped down to lower layer ATM problems. The ATM destination address is encoded into the destination address of the imitation header. The port address upon which the data frame is captured is used as the source address of the imitation header. The inventive interface will allow the use of existing software which requires MAC headers to perform protocol analysis of routed ATM frames.

21 Claims, 1 Drawing Sheet

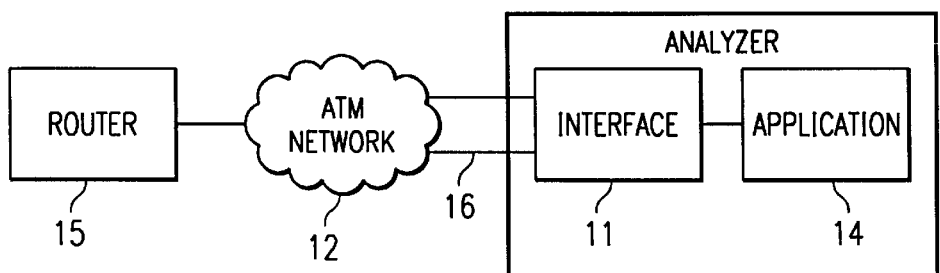
FIG. 1
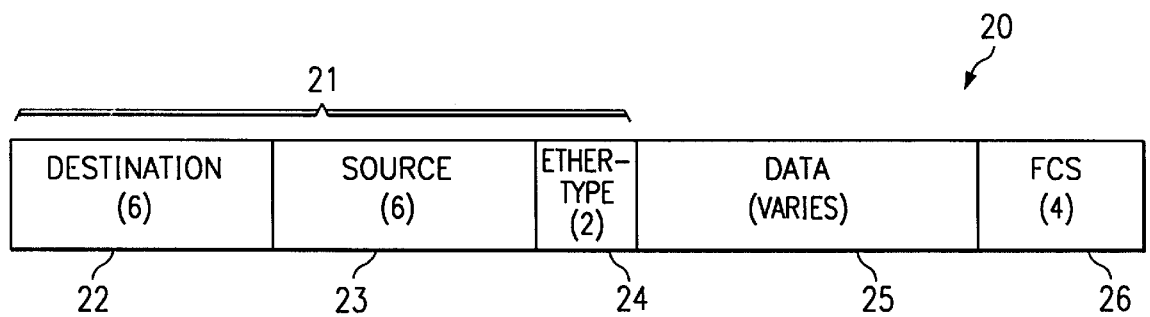
FIG. 2
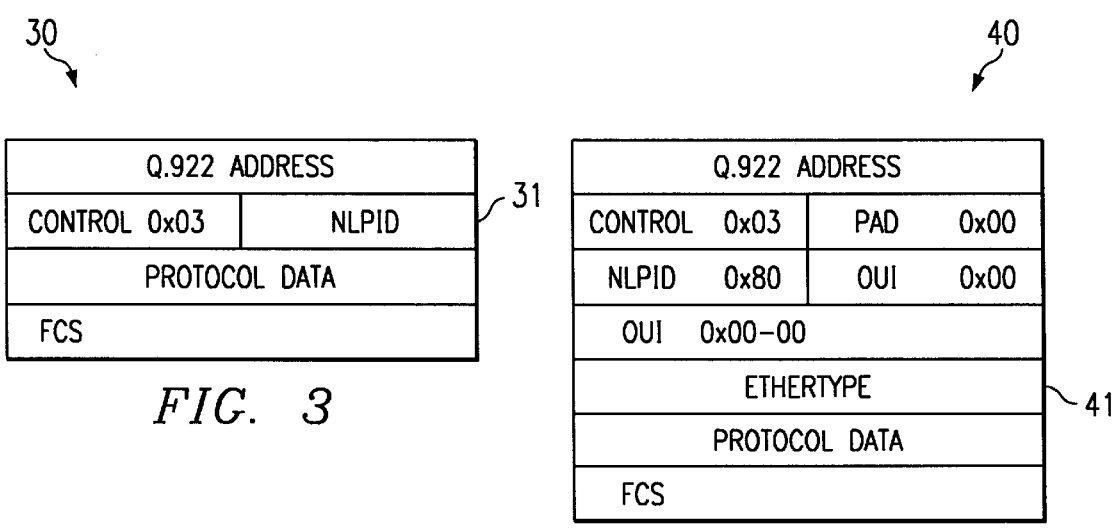
FIG. 3
FIG. 4

GENERATION OF INFORMATIVE MAC HEADERS FOR ANALYSIS OF ATM ROUTED LAN FRAMES

BACKGROUND OF THE INVENTION

ATM or asynchronous transfer mode is a data communications standard for allowing the delivery of data packets or frames to and from different network elements. An ATM network allows for the use and transfer of multiple types of data, e.g. constant bit rate, variable bit rate such as packets, video data, voice data, etc.

ATM transfers two types of Ethernet data. One type is bridged data or bridged frames. ATM bridged frames retain both the source and destination MAC address (Media Access Control), which may be a hardware address of a NIC (Network Interface Card) card in a PC. Thus, with bridged data, the source unit and destination unit are known. The other type of data is routed data or routed frames. Bridged data is used when a physical network is extended to include a larger number of network elements. Bridged data is viewed by all of the elements attached to the network. Routed data is used when a physical network is segmented, e.g. segmented geographically. The segmentation allows the data to be intelligently routed, i.e. routed to a specific device. The routed data is only viewed by the elements attached to the segment and not the entire network, if the routing is properly performed. Thus, system bandwidth is used more efficiently with routed data. A router selects a path based upon specific protocols and the destination address, and attempts to select the best or shortest path. Thus, the routers may strip the MAC headers off of the frames, and insert their own specific routing codes. Routers may be attached to an ATM network for the transmission of data. ATM uses a VPI (Virtual Path Identifier), and VCI (Virtual Channel Identifier), which together, make up a destination address, VP.VC.

The stripped headers cause problems during network analysis, particularly when the network analyzer software is designed to work with frames that have MAC headers. The exact source and destination MAC address of the routed frame may not be determined as the source information has been stripped out.

One prior art solution is to not reformat the data and just analyze the stripped frames. However, this approach results in a large reduction in the amount of LAN or WAN analysis that can be performed, particularly the lower layer analysis, as the source and destination of the data is not known. Thus, the MAC address layer would be lost, and the physical source and destination units could not be examined. Note that the lower layers would include physical and datalink layers, and the upper layers include network up through application layers. Since the data carried within the routed frame may include upper level addressing, e.g. TCP port or application address, then upper level analysis may take place.

Therefore, there is a need in the art for mechanism which allow network analysis software to operate on ATM systems using routed frames with MAC headers which have been stripped out, with the benefit of being able to tie upper layer analysis back to the lower layer ATM traffic carrying the data.

SUMMARY OF THE INVENTION

These and other objects, features and technical advantages are achieved by a system and method which allows routed frames to be analyzed by software that expects a MAC layer header.

The inventive mechanism is an interface which generates imitation MAC addresses and places the imitation addresses in the proper location, which is before the data portion of the frame. Thus, the software may perform analysis of the ATM network protocol layer and higher layers.

The imitation address is formed from useful information which will enhance the troubleshooting process of the analyzer software. The information would allow for upper layer protocol problems to be mapped down to lower layer ATM problems. The information must fill two addresses in order to create the imitation header which will be placed at the front of a routed frame, the source and the destination. Since ATM is destination based, the ATM destination address is encoded into the destination address of the imitation header. The port address upon which the data frame is captured is used as the source address of the imitation header. While this will not precisely identify the exact source of the frame, it will provide some intelligence as to its identity.

This invention will allow the use of existing software to do protocol analysis of routed ATM frames, and provide a link back to the ATM cells that carried the data. If for instance, the upper layer protocol analysis indicates a re-transmission at one of the upper layers, the encoded information would allow inspection of the cell layer and examination of data on the specific VP.VC to determine if the re-transmissions were the result of problems at the ATM layer, i.e. HEC errors.

Therefore, it is a technical advantage of the invention to allow network analyzer software which expects MAC protocols to operate with ATM routed frames.

It is a further technical advantage of the invention to generate imitation MAC headers from useful information which will improve the troubleshooting process of the network analyzer software.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 depicts the inventive interface mechanism coupled to an ATM network;

FIG. 2 depicts an example of an Ethernet frame with a MAC header;

FIG. 3 depicts an example of a routed frame relay frame with the MAC header stripped off using a NLPID; and FIG. 4 depicts an example of a routed frame relay frame with the MAC header stripped off and including a SNAP header.

DESCRIPTION OF THE PREFERRED EMBODIMENTS

FIG. 1 depicts the inventive interface mechanism 11 coupled ATM network 12 and network analyzer 13. The analyzer 13 is connected to the network 12 via two ports 16. Note that the analyzer could have more than two ports, and the interface 11 could reside outside of the analyzer 13, i.e. between the network 12 and the analyzer 13. Router 15 is connected to the ATM network 12. The network analyzer 13 includes protocol analysis application 14. An example of such an application is the Off-Net Sniffer® software for Ethernet from Network General Corporation. Typically, analysis applications can capture network data in one format, i.e. frame data which includes a MAC header because the router sends the frame to a particular location, whereas, a bridge would send the frame to all locations on the link. However, router 15 would send a frame without the MAC header. For example, the RFC 1483 routed frame 30 as shown in FIG. 3, wherein the MAC header has been stripped off by the router 15.

The inventive interface 11 places a MAC header 21 into the routed frame, and forms an ethernet frame 20 as shown in FIG. 2. The MAC header will allow the application to process the data in the routed frame. Generating a place holder, which provides no useful information, will allow the processing of the frame. However, the analyzer will only be able to perform analysis from the network layer on up, and will not be able to map the data frame down to the ATM address layer. The MAC header includes destination address 22, source address 23, and ethertype 24. These are depicted in FIG. 2 as being 6, 6, and 2 octets in size, respectively. The remainder of the frame 20 includes data 25 and FCS 26 or frame check sequence which is for error detection.

Instead using a place holder, the interface 11 inserts useful information about the source and destination of the data frame into the MAC header. Thus, the analyzer can associate the LAN data in the frame down to the ATM layer or headers. The interface generates the two addresses, source and destination, that form a MAC header along with a proper ethertype, and places the generated header at the front of a routed frame. Note that in some instances the ethertype 41 is present in the routed frame, as shown in FIG. 4, and in other instances the ethertype may have been stripped out along with the MAC addresses, as shown in FIG. 3. The inventive interface 11 will either locate the ethertype 41 in the routed frame, or will fabricate the ethertype from data within the routed frame, e.g. the network level protocol ID (NLPID) 31. The inventive interface 11 will then place the ethertype in the proper location of the MAC header, as shown in FIG. 2.

Since ATM is destination based, the ATM destination address is encoded into the destination address of the generated MAC header. The generated destination address is 48 bits, which corresponds to a MAC header address. The ATM addressing use to generate the MAC address is either UNI having 24 bits or NNI having 28 bits, both of which describe the VP.VC identifiers. Thus, the remaining portion of the 48 bits may be filled in with other data. Such data can include codes which indicate that the address is a generated address, and not an actual address. The following is an example of the encoding for a generated destination address. The first 3 bytes, or 24 bits, are encoded with the HP company prefix, 0x80, 0x00, 0x09. This could be used to identify that the source is a generated addresses. The next byte, or 8 bits, is encoded with the 8 bit UNI Virtual Path Identifier (VP) from the ATM destination address. The next 2 bytes, or 16 bits, are encoded with the 16 bit UNI Virtual Channel Identifier (VC). Thus, the analyzer 13 would be able to determine which VP.VC the frame data was destined for on the ATM network. For example, the analyzer would be able to detect the amount of traffic destined to a particular address in the network, as identified by the VP.VC.

As stated earlier, ATM is destination based, and thus, does not transmit source data. Thus, the interface 11 generates a source address from other information. The generated source address is 48 bits, which corresponds to a MAC source address. The interface uses the 8 bit address of the port upon which the analyzer 13 has capture the frame data. Thus, the remaining portion of the 48 bits must be filled in with other data. Such data can include codes which indicate that the address is a generated address, and not an actual address. The following is an example of the encoding for a generated source address. The last 8 bits of the source address comprise the analyzer port upon which the frame data was captured, e.g. port 0 or 1. The first 3 bytes or 24 bits are encoded with the HP company prefix, 0x80, 0x00, 0x09. This could be used to identify that the source is a generated addresses. In the next two bytes, or 16 bits, the hex values of the word FAB are encoded, which are 0x0F, 0xAB. This also indicates that the source address is generated of fabricated.

Note that the generated source address does not specify the source of the frame. However, it does provide some intelligence back to the ATM layer that was carrying the data. The knowledge of the port would provide an indication as to which portion of the ATM network was carrying the data. This would be of assistance in determining the root cause of ATM level errors. For instance, a fiber or wire could be followed back to the transmitting port. Thus, the transmitting port could then be tested to determine if the hardware on the port is functioning properly. Note that there are two ports shown in FIG. 1, however, the inventive mechanism can encode more than two ports as the point of capture of the data frame.

The inventive interface mechanism 11 will also operate with WAN data, known as ATM Frame Relay data. For example, the RFC 1490 relay frame 40 as shown in FIG. 4, wherein the MAC header has been stripped off by the router 15. Note that the frame of FIG. 4 also includes a sub-network access protocol (SNAP) header. WAN frame relay is another layer of protocol, which resides on top of ATM protocol. Frame relay has its own identifier, DLCI, for Data Link Channel Identifier. The inventive interface encodes this identifier into the generated MAC header. Thus, the frame data could be mapped back to the frame relay addressing protocol layer, as well the ATM addressing protocol layer.

Frame relay is also destination based, and thus, DLCI would be encoded into the generated destination address. The following is an example of an encoding for a generated destination address of frame relay data. The first 3 bytes or 24 bits of the generated address are encoded with the DLCI identifier. The next byte, or 8 bits, is encoded with the 8 bit UNI Virtual Path Identifier (VP) from the ATM destination address. The next 2 bytes, or 16 bits, are encoded with the 16 bit UNI Virtual Channel Identifier (VC). The source address could be encoded as follows. The first 3 bytes or 24 bits are encoded with the HP company ID or prefix, 0x80, 0x00, 0x09. The next two bytes, or 16 bits, are encoded with the hex values of 0xD1C1, which would indicate that the address includes frame relay DLCI (note the similar appearance to the encoded D1C1). The last 8 bits of the source address comprise the analyzer port upon which the frame data was captured, e.g. port 0 or 1.

Thus, the analyzer 13 would be able to determine which VP.VC the frame data was destined for on the ATM network and the frame relay channel that carried the data. Thus, upper layer data can be mapped back down to the ATM protocol layer, or to a particular DLCI on the frame relay layer.

Although the present invention and its advantages have been described in detail, it should be understood that various changes, substitutions and alterations can be made herein without departing from the spirit and scope of the invention as defined by the appended claims.

What is claimed is:

1. A method for transforming a routed data frame into an addressed frame having a source address and a destination address, wherein the routed data frame lacks the source address and the destination address, the method comprising the steps of:

receiving the routed data frame from a network;

fabricating the source address from network information obtained from the step of receiving the routed data frame;

fabricating the destination address from frame information obtained from the routed data frame; and associating the source address and the destination address with the routed data frame to form the addressed frame;

wherein the step of fabricating the source address comprises the steps of:

determining a device port identifier upon which the routed data frame is received during operation of the step of receiving; and using the device port identifier as a portion of the source address.

2. The method of claim 1, wherein the step of fabricating the source address further comprises the step of:

including a fabrication identifier that indicates that the source address is fabricated.

3. The method of claim 1, wherein the step of fabricating the destination address comprises the steps of:

determining a path identifier and a channel identifier used to route the routed data frame; and using the path identifier and the channel identifier as a portion of the destination address.

4. The method of claim 3, wherein the routed data frame is a frame relay data frame, wherein the step of fabricating the destination address further comprises the steps of:

determining a link channel identifier used to route the frame relay data frame; and using the link channel identifier as another portion of the destination address.

5. The method of claim 3, wherein the step of fabricating the destination address further comprises the step of:

including a fabrication identifier that indicates that the destination address is fabricated.

6. The method of claim 1, wherein the source address, the destination address, and an ethertype form a fabricated MAC header, the method further comprising the steps of:

determining the ethertype from the frame information; and associating the ethertype with the addressed frame to form a MAC addressed frame;

wherein the MAC addressed frame is used by an analysis software that requires a MAC header on input frames.

7. The method of claim 1, wherein:

the network information is a device port identifier upon which the routed data frame is received; and the frame information is a virtual path identifier and a virtual channel identifier used to route the routed data frame.

8. A data frame that has been routed through a system router on a network, the frame comprises:

a fabricated source address that includes a port identifier that indicates a port on a device that receives the data frame; and a fabricated destination address that includes a virtual path identifier and a virtual channel identifier used by an ATM device connected to the router;

wherein the source address, the destination address, and an ethertype form a fabricated MAC header; and the MAC addressed frame is used by an analysis software that requires a MAC header on input frames.

9. A data frame that has been routed through a system router on a network, the frame comprises:

a fabricated source address that includes a port identifier that indicates a port on a device that receives the data frame; and a fabricated destination address that includes a virtual path identifier and a virtual channel identifier used by an ATM device connected to the router;

wherein the fabricated source address includes a fabrication identifier that indicates that the fabricated source address is fabricated; and the fabricated destination address includes a fabrication identifier that indicates that the fabricated destination address is fabricated.

10. A data frame that has been routed through a system router on a network, the frame comprises:

a fabricated source address that includes a port identifier that indicates a port on a device that receives the data frame; and a fabricated destination address that includes a virtual path identifier and a virtual channel identifier used by an ATM device connected to the router;

wherein the data frame is a frame relay data frame, wherein the fabricated destination address further comprises:

a link channel identifier used to route the frame relay data frame.

11. An interface apparatus for transforming a routed data frame into an addressed frame having a source address and a destination address, wherein the apparatus is coupled to a network, wherein the routed data frame lacks the source address and the destination address, and the apparatus comprises:

at least one port that receives the routed data frame from the network;

means for fabricating the source address from network information obtained from the at least one port;

means for fabricating the destination address from frame information obtained from the routed data frame; and means for associating the source address and the destination address with the routed data frame to form the addressed frame;

wherein the means for fabricating the source address determines an identifier of the at least one port and forms the source address with the identifier.

12. The apparatus of claim 11, wherein:

the means for fabricating the source address includes a fabrication identifier in the source address that indicates that the source address is fabricated.

13. The apparatus of claim 11, wherein:

the means for fabricating the destination address determines a path identifier and a channel identifier used to route the routed data frame and forms the destination address with the path identifier and the channel identifier.

14. The apparatus of claim 13, wherein:

the routed data frame is a frame relay data frame; and the means for fabricating the destination address determines a link channel identifier used to route the frame relay data frame and forms the destination address with the link channel identifier.

15. The apparatus of claim 13, wherein:

the means for fabricating the destination address includes a fabrication identifier in the destination address that indicates that the destination address is fabricated.

16. The apparatus of claim 11, wherein the fabricated source address, the fabricated destination address, and an ethertype form a fabricated MAC header, the apparatus further comprising:

means for determining the ethertype from the frame information; and means for associating the ethertype with the addressed frame to form a MAC addressed frame;

wherein the MAC addressed frame is used by an analysis software that requires a MAC header on input frames.

17. The apparatus of claim 11, wherein:

the network information is an identifier of the at least one port; and the frame information is a virtual path identifier and a virtual channel identifier used to route the routed data frame.

18. A network analysis apparatus for analyzing a routed data frame on a network, wherein the routed data frame on the network lacks the source address and the destination address, the apparatus comprising:

at least one port that receives the routed data frame from the network;

an interface that transforms the received routed data frame into an addressed frame having a source address and a destination address; wherein the interface comprises:

means for fabricating the source address from network information obtained from the at least one port;

means for fabricating the destination address from frame information obtained from the routed data frame; and means for associating the source address and the destination address with the routed data frame to form the addressed frame; and means for performing analysis with the addressed frame.

19. The apparatus of claim 18, further comprising:

means for recognizing a fabrication identifier in the source address of the routed data frames that indicates that the source address is fabricated; and means for recognizing a fabrication identifier in the destination address of the routed data frames that indicates that the destination address is fabricated.

20. The apparatus of claim 18, further comprising:

means for recognizing the source address includes at least one port identifier used in forming the source address of the routed data frames; and mean for recognizing the destination address includes a path identifier and a channel identifier used in forming the destination address of the routed data frames.

21. The apparatus of claim 18, further comprising:

means for linking back to network cells which carried the received routed data frame.

\* \* \* \* \*